United States Patent
Vorobyov et al.

(10) Patent No.: US 12,292,973 B2
(45) Date of Patent: May 6, 2025

(54) QUERY GENERALIZATION FOR PREVENTION OF INJECTION ATTACKS

(71) Applicant: Oracle International Corporation, Redwood Shores, CA (US)

(72) Inventors: Kostyantyn Vorobyov, Brisbane (AU); Padmanabhan Krishnan, Brisbane (AU)

(73) Assignee: Oracle International Corporation, Redwood Shores, CA (US)

( * ) Notice: Subject to any disclaimer, the term of this patent is extended or adjusted under 35 U.S.C. 154(b) by 596 days.

(21) Appl. No.: 17/677,675

(22) Filed: Feb. 22, 2022

(65) Prior Publication Data
US 2023/0267203 A1    Aug. 24, 2023

(51) Int. Cl.
*G06F 21/00* (2013.01)
*G06F 21/56* (2013.01)

(52) U.S. Cl.
CPC ...... *G06F 21/566* (2013.01); *G06F 2221/034* (2013.01)

(58) Field of Classification Search
CPC ............. G06F 21/566; G06F 2221/034; G06F 16/245; G06F 21/577
See application file for complete search history.

(56) References Cited

U.S. PATENT DOCUMENTS

| | | | | |
|---|---|---|---|---|
| 7,444,331 B1 * | 10/2008 | Nachenberg | ........ | G06F 16/2455 |
| 7,558,796 B1 * | 7/2009 | Bromwich | .......... | G06F 16/2358 |
| 7,690,037 B1 * | 3/2010 | Hartmann | ........... | H04L 63/1416 726/25 |
| 7,711,750 B1 * | 5/2010 | Dutta | .................. | G06F 21/6227 707/999.009 |
| 7,774,361 B1 * | 8/2010 | Nachenberg | ........ | H04L 63/1416 707/952 |
| 8,046,374 B1 * | 10/2011 | Bromwich | ............ | G06F 21/552 707/952 |
| 2006/0212438 A1 * | 9/2006 | Ng | .................... | G06F 16/24534 |
| 2014/0283096 A1 * | 9/2014 | Neerumalla | ............ | G06F 21/10 726/26 |
| 2017/0039482 A1 * | 2/2017 | Bishop | .............. | G06F 16/24526 |

(Continued)

OTHER PUBLICATIONS

G.M. Howard, et al., "psigene: Webcrawling to Generalize SQL Injection Signatures", In 44th Annual IEEE/IFIP International Conference on Dependable Systems and Networks, Jan. 1, 2014, 12 pages.

(Continued)

*Primary Examiner* — Yogesh Paliwal
(74) *Attorney, Agent, or Firm* — Lathrop GPM LLP

(57) ABSTRACT

A method for generating a query filter list includes obtaining set of training queries, each training query comprising a predicate and one or more accessed columns returned from evaluating the predicate, and transforming the set of training queries into a structure. The structure relates, for an accessed column and a training query, the predicate and a correlation value to the accessed column. The method further includes normalizing the structure into a normalized structure. The normalized structure grouping entries in the structure according to accessed column. The method further includes generating a generalized query from the normalized structure, and adding the generalized query to the query filter list.

20 Claims, 5 Drawing Sheets

(56) References Cited

U.S. PATENT DOCUMENTS

2018/0349627 A1* 12/2018 Kaushik ............... H04L 9/0643
2020/0097587 A1* 3/2020 Klein ................. G06F 16/2462

OTHER PUBLICATIONS

M. Liu, et al., "Deepsqli: Deep Semantic Learning for Testing SQL Injection", In Proceedings of the 29th ACM SIGSOFT International Symposium on Software Testing and Analysis (ISSTA), May 24, 2020, 21 pages.

C. Wang, et al., "Synthesizing Highly Expressive SQL Queries from Input-Output Examples", In PLDI, Jun. 18-23, 2017, 15 pages.

N. Yaghmazadek, et al., "SQLizer: Query Synthesis Form Natural Language", In OOPSLA, Jan. 1, 2017, 25 pages.

* cited by examiner

QUERY GENERALIZATION FOR PREVENTION OF INJECTION ATTACKS

BACKGROUND

Applications that use query language (e.g., Structured Query Language, or SQL) statements may become vulnerable when attacker-controlled inputs flow to the query language statements. For example, query language injections may occur when an attacker causes a query language statement to extract sensitive data, to compromise data integrity, or cause denial of service. Although defenses against query language injection exist, the complexity of software applications often means that applications remain vulnerable to query language injection attacks. One way to prevent query language injection is to identify and prevent the execution of malicious queries at runtime.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In general, in one aspect, one or more embodiments relate to a method for generating a query filter list. The method includes obtaining set of training queries, each training query comprising a predicate and one or more accessed columns returned from evaluating the predicate, and transforming the set of training queries into a structure. The structure relates, for an accessed column and a training query, the predicate and a correlation value to the accessed column. The method further includes normalizing the structure into a normalized structure. The normalized structure grouping entries in the structure according to accessed column. The method further includes generating a generalized query from the normalized structure, and adding the generalized query to the query filter list.

In general, in one aspect, one or more embodiments relate to a system that includes a query analyzer repository, a computer processor, and a query filter list generator executing on the computer processor. The query analyzer repository is configured to store a query filter list comprising a generalized query, and a set of training queries, each training query comprising a predicate and one or more accessed columns returned from evaluating the predicate. The query filter list generator is configured to transform the set of training queries into a structure, the structure relating individually, for an accessed column and a training query, the predicate and a correlation value to the accessed column, normalize the structure into a normalized structure, the normalized structure grouping entries in the structure according to accessed column, generate a generalized query from the normalized structure, and add the generalized query to a query filter list.

In general, in one aspect, one or more embodiments relate to a method that includes receiving a target query, comparing the target query to a generalized query in a query filter list to obtain a comparison result, wherein the query filter list is generated by generalizing a set of training queries into the generalized query, and make a determination whether to execute the target query based on the comparison result.

Other aspects of the invention will be apparent from the following description and the appended claims.

DETAILED DESCRIPTION

Figure 1:
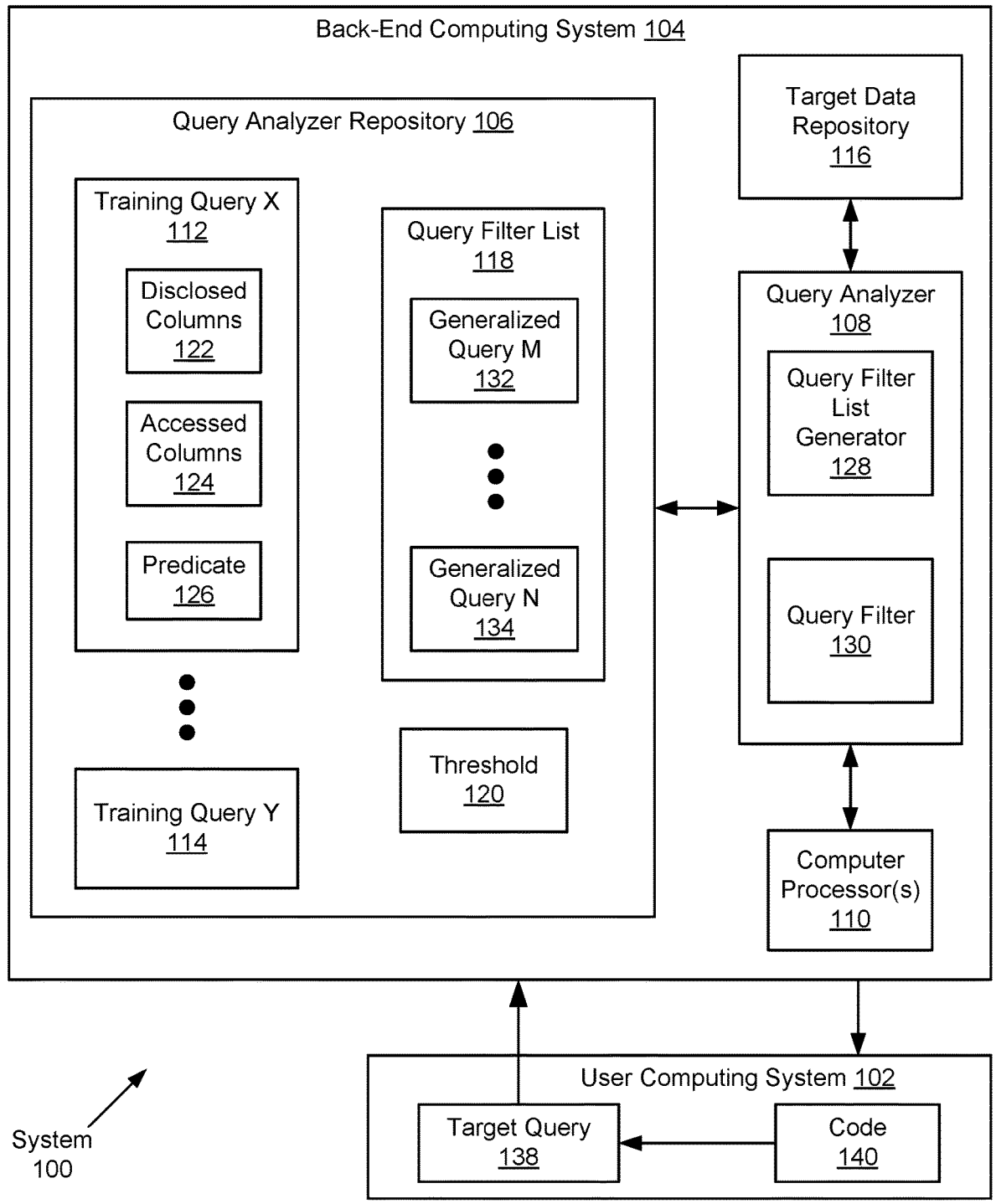
FIG. 1 shows a system in accordance with one or more embodiments of the invention.

Specific embodiments of the invention will now be described in detail with reference to the accompanying figures. Like elements in the various figures are denoted by like reference numerals for consistency.

In the following detailed description of embodiments of the invention, numerous specific details are set forth in order to provide a more thorough understanding of the invention. However, it will be apparent to one of ordinary skill in the art that the invention may be practiced without these specific details. In other instances, well-known features have not been described in detail to avoid unnecessarily complicating the description.

Embodiments of the invention are directed to generating a query filter list (e.g., allow list or deny list) for detecting a security vulnerability and applying the query filter list to target queries. The query filter list is a list of generalized queries that are generated from a set of training queries. The generalization is an over approximation of the training queries in the set of training queries.

A training query includes at least one accessed column, a predicate, and optionally one or more disclosed columns. The accessed columns are columns of a table that are returned responsive to the query. One or more embodiments group the training queries into a structure that includes an entry for each training query and accessed column. The structure is normalized, where the normalization groups entries by accessed columns, to generate a normalized structure. Through generalization of the normalized structure, a generalized query is generated and added to the query filter list. The generalized query may then be compared against new target queries to determine whether to allow the target queries to be processed.

FIG. 1 shows a system (100) in accordance with one or more embodiments of the invention. As shown in FIG. 1, the system (100) includes a user computing system (102) and a back-end computing system (104). In one or more embodiments, the user computing system (102) and the back-end computing system (104) take the form of the computing system (600) described with respect to FIG. 6A and the accompanying description below or take the form of the client device (626) described with respect to FIG. 6B. The back-end computing system (104) includes a target data repository (116), a query analyzer repository (106), a query analyzer (108), and computer processor(s) (110).

The repositories (e.g., target data repository (116), query analyzer repository (106)) is each any type of storage unit and/or device (e.g., a file system, database, collection of tables, or any other storage mechanism) for storing data. Further, the repositories may include multiple different storage units and/or devices. The multiple different storage units and/or devices may or may not be of the same type or located at the same physical site. The repositories may be accessed online via a cloud service (e.g., Oracle Cloud, Amazon Web Services (AWS), Egnyte, Azure, etc.).

In one or more embodiments, the target data repository (116) is a structured repository that includes target data which is being accessed by the query. Any structural database may be used as the target data repository. In one or more embodiments, the target data repository (116) includes multiple tables. Each table includes rows and columns. As used in the present application, a column refers to an attribute or field of a table and rows refer to records in the table. A column has a unique column identifier. For example, the column identifier may be a field name concatenated with a table name. Records includes attribute values for the attributes. Although tables, rows, and columns are used, any structure of a data repository may be used. Further, the target data repository (116) may be controlled and/or located on a separate entity than one or more other components of the back-end computing system (104).

In one or more embodiments, the query analyzer repository (106) includes functionality to store training queries (e.g., training query X (112), training query Y (114)), a query filter list (118) and a threshold (120). The system also includes target query (138). The training queries (e.g., training query X (112), training query Y (114)) and the target query (138) is a query to the target data repository (116) represented in a query language, such as the Structured Query Language (SQL).

A query is a request for information to the target data repository (116). The training query (e.g., training query X (112), training query Y (114)) is a request for information from the target data repository (116). The query (e.g., training query X (112)) includes one or more disclosed columns (122), one or more accessed columns (124), and a predicate (126).

A disclosed column (122) is a column whose value(s) are included in the results of the query. An accessed column (124) is a column whose value(s) are accessed (e.g., read) by the query. A disclosed column (122) is also an accessed column (124) because the disclosed column (122) is accessed in order to be disclosed. A predicate (126) is a Boolean expression that determines which value(s) of the disclosed columns (122) are disclosed and which value(s) of the accessed columns (124) are accessed. For example, a predicate (126) may include a WHERE, ON, or HAVING clause in an SQL statement. A query (e.g., the training query (112) or the target query (138)) may disclose values of the disclosed columns (122) and access values of the accessed columns (124) when the predicate (126) is satisfied. The result of executing a query may be one or more rows. The rows may be included in a table. An example of a query is: SELECT a, b from T WHERE c=1 AND d>5, where columns a and b from table T are disclosed columns, columns c and d are accessed columns (in addition to columns a and b), and the predicate is the Boolean expression c=1 AND d>5.

The training query (e.g., training query X (112), training query Y (114)) may be a query that have a known state of either benign (e.g., safe to execute) or malicious. The benign training query (112) may be known not to include a security vulnerability. The malicious training query (112) is known to include a security vulnerability. The set of training queries are training queries that are used to generate a query filter list. The target query (138) may be a query that is generated by executing code (140). The target query is the query that is unknown whether to be benign or malicious.

In one or more embodiments, the query analyzer repository (106) includes a query filter list (118). In one or more embodiments, the query filter list (118) may be either an allow list or a deny list. If an allow list, the generalized queries in the query filter list are authorized to be executed. If a deny list, the generalized queries in the query filter list cannot be executed and are deemed to have a security vulnerability. In some embodiments, multiple query filter lists exist, whereby at least one of the query filter lists is an allow list and another of the query filter lists is a deny list. Queries that are categorized in the allow list and not in the deny list are allowed to be executed.

A query filter list (118) is a list of generalized queries (e.g., generalized query M (132), generalized query N (134)). A generalized query is a set of training queries that are generalized into a query. The generalized query includes disclosed columns, accessed columns, and predicates. In some embodiments, the generalized query includes subqueries, each including one or more disclosed columns, one or more accessed columns, and one or more predicates. The subqueries may be combined through disjunction such that matching a sub-query means that the generalized query is matched.

The generalization is in the generalization of columns, a generalization of predicates, and a separation between accessed columns and predicates. The generalization of columns transforms, for any table satisfying a threshold (120), identifiers of the accessed columns of the table to a table identifier. Thus, by changing the column identifiers to the table identifier, any column in the table is part of the generalized query. The threshold (120) may be a minimum number or a percentage. The generalization of predicates may be a generalization of ranges or other generalizations that are applied. The separation between correlated accessed columns and predicates removes the explicit relationship as to which correlated accessed column is in the same query as each predicate. Thus, the generalized query is a more generalized form of the training queries.

A query analyzer (108) is a server tool, such as software or hardware, configured to prevent injection attacks. An injection is a web security vulnerability that allows an attacker to interfere with the queries that code (140) makes to the target data repository (116). The injection generally allows an attacker to view data that the attacker is not normally able to retrieve, such as data of other users, or other data that the code (140) is able to access. Injection attack prevention mitigates for injection attacks. The query analyzer (108) includes a query filter list generator (128) and a query filter (130). The query filter list generator (128) is configured to generate a query filter list (118) automatically using training queries that are prelabeled. The query filter list generator (128) may be configured to update the query filter list (118) as new queries are labeled. The query filter (130) is configured to filter target queries using the generated query filter list. The query filter (130) is configured to compare the target query (138) to the generalized queries in the query filter list (118) to obtain a comparison result. The comparison result may be whether the target query is malicious, benign, or if separate approval should be provided.

The target query (138) may be considered malicious when the target query (138) has no more information than a generalized query (e.g., generalized query M (132), generalized query N (134)) in a deny list. Further, the target query (138) may be considered malicious (e.g., the target query (138) may include a security vulnerability), when the target query (138) has more information than a generalized query in the allow list. The target query (138) may be considered benign when the target query (138) has no more information than a generalized query (e.g., generalized query M (132), generalized query N (134)) in an allow list. The target query (138) has no more information than the generalized query when the following criteria are satisfied:

1) the target disclosed columns of the target query (138) are a subset of the generalized disclosed columns of the generalized query,
2) the target accessed columns of the target query (138) are a subset of the generalized accessed columns of the generalized query, and
3) the target predicate of the target query (138) implies the generalized predicate of the generalized query.

The user computing system (102) may be a mobile device (e.g., phone, tablet, digital assistant, laptop, etc.) or any other computing device (e.g., desktop, terminal, workstation, etc.) with a computer processor (not shown) and memory (not shown) capable of running computer software. The user computing system (102) includes functionality to execute code (140) to generate a target query (138). The code (140) is a collection of statements (e.g., computer instructions) written in source code of a human-readable programming language. The user computing system (102) includes functionality to send the target query (138) to the query analyzer (108). The query analyzer (108) includes functionality to execute the query or send an alert to the user computing system (102) in response to receiving the target query (138).

In one or more embodiments, the computer processor(s) (110) takes the form of the computer processor(s) (602) described with respect to FIG. 6A and the accompanying description below. In one or more embodiments, the computer processor (110) includes functionality to execute the query analyzer (108).

While FIG. 1 shows a configuration of components, other configurations may be used without departing from the scope of the invention. For example, various components may be combined to create a single component. As another example, the functionality performed by a single component may be performed by two or more components.

Figure 2:
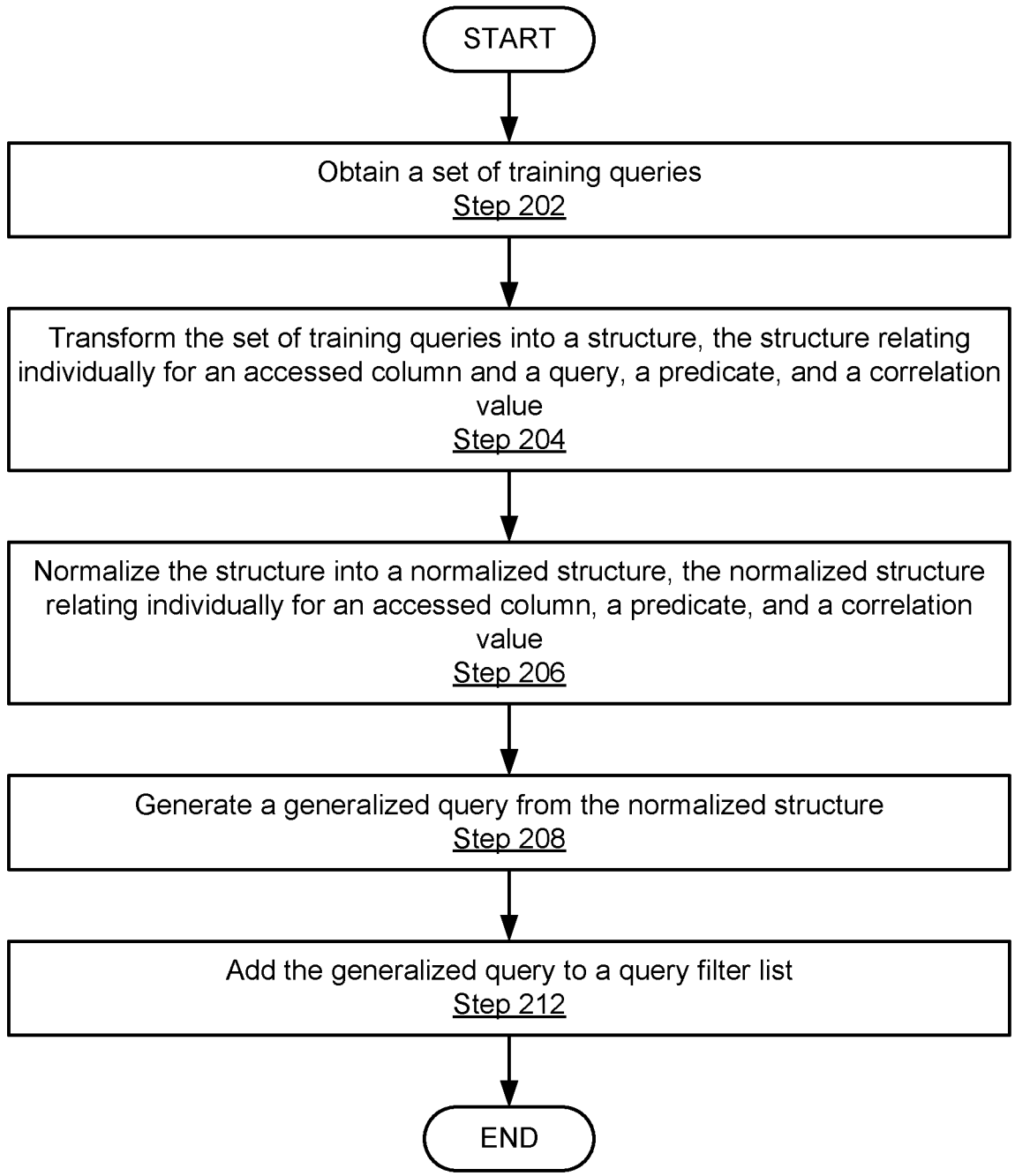
FIG. 2 and FIG. 3 show flowcharts in accordance with one or more embodiments of the invention.

FIG. 2 shows a flowchart in accordance with one or more embodiments of the invention. The flowchart depicts a process for generating a query filter list. One or more of the steps in FIG. 2 may be performed by the components (e.g., the query analyzer (108) of the back-end computing system (104) and/or the user computing system (102), discussed above in reference to FIG. 1). In one or more embodiments of the invention, one or more of the steps shown in FIG. 2 may be omitted, repeated, and/or performed in parallel, or in a different order than the order shown in FIG. 2. Accordingly, the scope of the invention should not be considered limited to the specific arrangement of steps shown in FIG. 2.

In Step 202, a set of training queries are obtained. The set of training queries may be obtained from the user computing system or from a separate system. The set of training queries are prelabeled as either benign or malicious. In some embodiments, the set of training queries are obtained over time. An initial set of training queries may be prelabeled and an initial query filter list generated. Then, as queries for the target data repository are processed, alerts may be generated when the new queries are received that do not match the generalized query. A user may then designate the query as benign or malicious, and the query labeled accordingly and used as a training query. Thus, the system may learn over time, which queries are benign and which queries are malicious.

In one or more embodiments, the operations of Steps 204-212 are performed separately for generating an allow list and generating a deny list. Thus, if the set of training queries include both benign and malicious training queries, the set of training queries are partitioned into a subset of benign training queries and a subset of the malicious training queries. The subset of benign training queries is processed through Steps 204-212 to generate an allow list. The subset of malicious training queries is processed through Steps 204-212 to generate a deny list.

In Step 204, the set of queries obtained in Step 202 are transformed into a structure. The structure relates, individually, for an accessed column and a query, a predicate and a correlation value. In one or more embodiments, a separate entry in the structure exists for each accessed column and training query combination. For example, the entry may be a triple having an accessed column identifier of the accessed column, a predicate of the query, and a correlation value. The correlation value is set having accessed column identifiers of accessed columns referenced in the query. Obtaining the correlation value may be performed as follows. A group of accessed columns that are accessed in the training query are determined. The group of accessed column identifiers are added as a correlation value for the accessed column.

In Step 206, the structure is normalized into a normalized structure. The normalized structure relates, individually, for an accessed column, a predicate and a correlation value. The normalization groups entries of the structure by accessed column. Thus, an entry in the normalized structure may have information from multiple training queries. An entry in the normalized structure includes an accessed column identifier, a set of predicates of queries that use the accessed columns, and a correlation value that is a combination of the correlation values grouped together. Generating the normalized structure includes, for each accessed column identifier, identifying a subset of entries that have the same accessed column identifier. The correlation values in the subset of entries are combined as a union of sets to create a correlation value for the accessed column identifier in the normalized structure. The predicates in the subset are grouped by generating a disjunction of predicates in the subset of entries. The disjunction is a predicate that is satisfied if any of the predicates in the disjunction are satisfied. Thus, the disjunction is related to the access column in the normalized structure. The normalization process is a first level of generalization of the queries. For example, the normalization process generalizes the mapping between correlation values and predicates so as to remove the per query basis.

In Step 208, a generalized query is generated from the normalized structure. Generating the generalized query may include generating a revised structure from the normalized structure, where the revised structure has generalized entries. From the revised structure, a generalized query is created. Generating the generalized performing column and predicate generalization. For column generalization, a determination is made whether, for each table, a threshold portion of accessed columns of the table are identified in the revised structure. The threshold may be defined as a number or a percentage and may be specific to the table. Each table may have a separate threshold defined. If the threshold is satisfied, then each accessed column identifier identifying an accessed column of the table is replaced with a generic table identifier for the table. Thus, the accessed column identifier is generalized to any column in the table. Predicate generalization may include generalization of ranges and other forms of predicate generalization.

In Step 212, the generalized query is added to the query filter list. By adding the generalized query to a query filter list, the generalized query may be used to determine whether target queries are malicious or benign.

Figure 3:
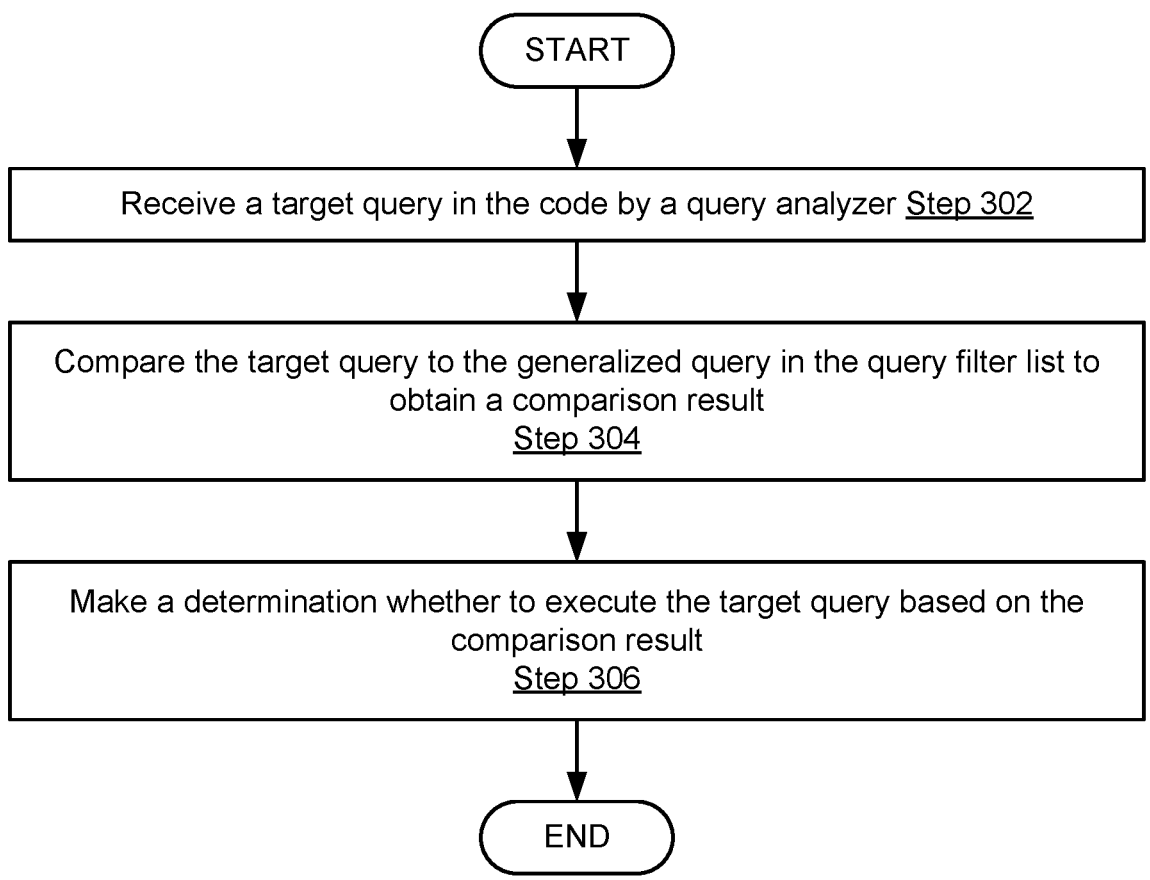

FIG. 3 shows a flowchart for processing a target query in accordance with one or more embodiments. In Step 302, a target query in the code is received by the query analyzer. The target query may be received via the network from the code when the code is executing.

In Step 304, the target query is compared to the generalized query in the query filter list to obtain a comparison result. A generalized query is obtained from the query filter list and compared against the target query to determine whether the generalized query is equivalent to or a more general version of the target query. If the generalized query is equivalent to or a more general version of the target query, then the comparison result indicates that the target query is benign or malicious depending on whether the query filter list is an allow list or a deny list. If the query filter list is a deny list, and the generalized query is equivalent to or a more general version of the target query, then the comparison result indicates that the target query is malicious. If the query filter list is an allow list, and the generalized query is equivalent to or a more general version of the target query, then the comparison result indicates that the target query is benign.

If the generalized query does not satisfy the above conditions, the process may continue until a generalized query in the query filter list is identified that is a more general version of the target query. If there are no more generalized queries to compare against the target query, then the comparison result indicates that the target query is malicious.

In Step 306, a determination is made whether to execute the target query. The target query is executed when the comparison result indicates that the target query is benign. If the comparison result indicates that the target query is malicious than the target query is not executed and/or an alert is issued in accordance with one or more embodiments.

Figure 4:
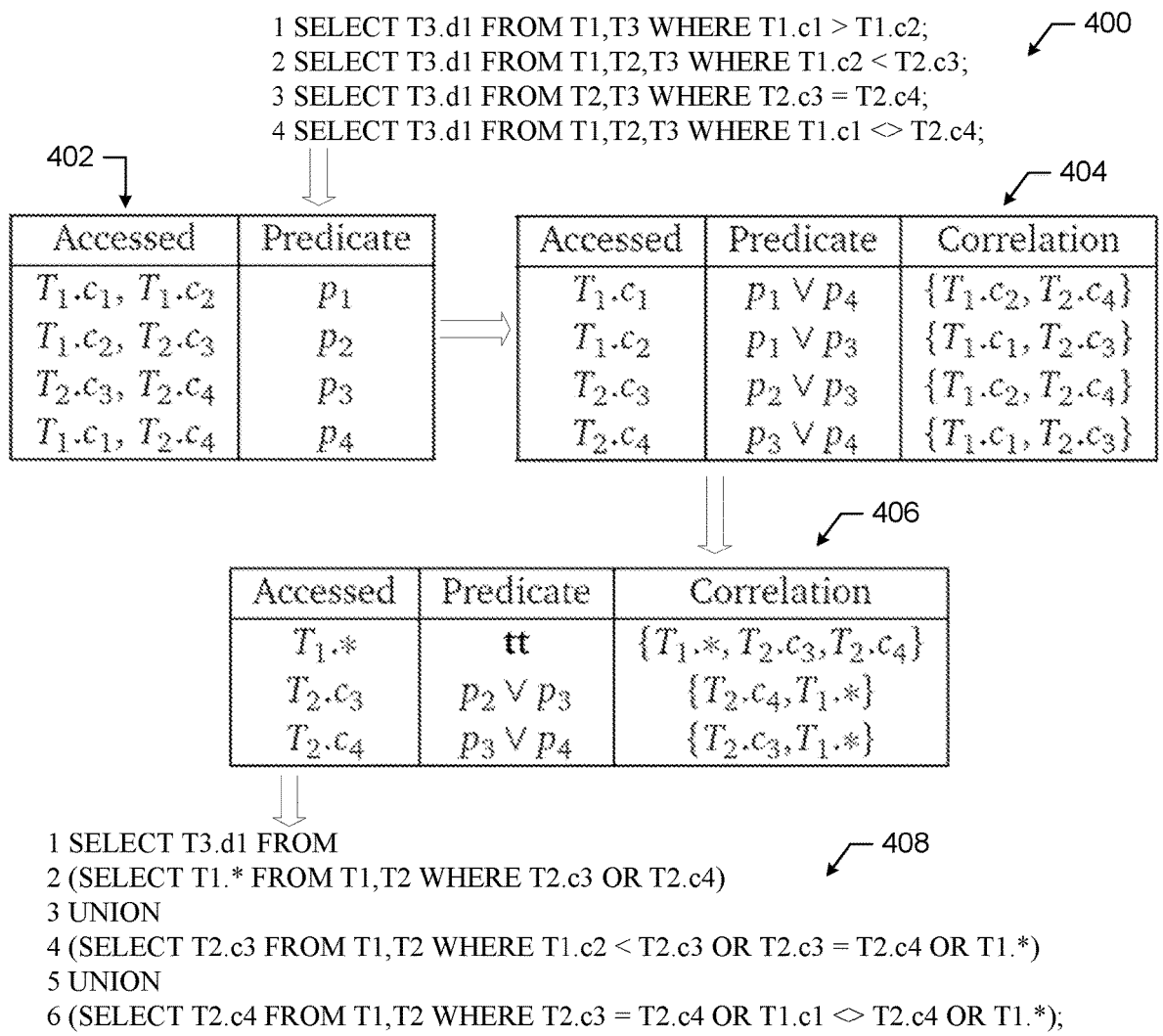
FIGS. 4 and 5 show examples in accordance with one or more embodiments of the invention.
Figure 5:
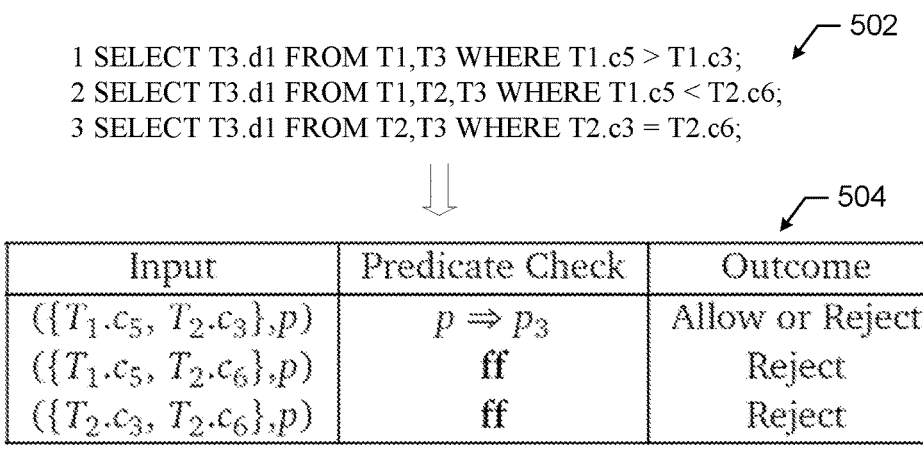

FIGS. 4 and 5 show implementation examples in accordance with one or more embodiments. In the example of FIGS. 4 and 5, consider the scenario in which the query filter list is an allow list. The implementation examples are for explanatory purposes only and not intended to limit the scope of the invention. One skilled in the art will appreciate that implementation of embodiments of the invention may take various forms and still be within the scope of the invention.

For the following example, consider the input SQL queries shown in listing (400) that disclose column T3.d1. Thus, T3.d1 is a disclosed column and an accessed column. The difference between the four queries (labeled 1, 2, 3, and 4 in listing (400)) is the set of accessed columns and the actual predicates which actually access the accessed columns. In the example, T means table and c means column. Thus, T1 is table 1 and c1 is column 1. Further, T1.c2 is column 2 in table 1.

Table (402) is a representation of the queries in listing (400). In table (402), each query is a separate entry. For notation purposes, the predicates associated with queries 1-4 in listing (400) are denoted p1-p4, respectively. The left column lists, as a set, the accessed columns that are in the query. The right column lists the predicates.

From the queries, a normalized structure (table structure (404)) is created. In the example, the table structure is a normalized structure. Each entry in the table structure corresponds to an accessed column identifier. T1.c1 is accessed in query 1 and 4 and thus associated with predicate p1 and predicate p4. A single predicate is created that is the disjunction of predicates p1 and p4 as denoted by p1$\lor$p4. The correlation value for T1.c1 is the set {T1.c2, T2.c4} because T1.c1 is an accessed column with T1.c2 in query 1, and T1.c1 is an accessed column with T2.c4 in query 4. Entries are also created for each other accessed column.

Next, the normalized structure (404) is generalized to create a revised structure (406). For example, purposes, consider the scenario in which the threshold is set at 2 columns for table T1 and 3 columns for table T2. As shown the first column of normalized structure (404), two columns from each tables T1 and T2 are accessed. Based on the respective thresholds, only accesses to columns in table T1 are generalized in revised structure (406). For table T2, the access details are retained but the correlation information based on the generalization of T1 is updated in revised structure (406).

The revised structure (406) can be represented via the SQL query in listing (408). Listing (408) shows the generalized query with lines 2, 4, and 6 being sub-queries. For the sake of simplicity T1.*, in the "where" conditions, is used to denote a predicate that accesses access of all columns in T1 and always evaluates to true. In SQL this can be expressed as (T1.c1 OR T1.c2 . . . . OR T1.cn OR 1=1). Each sub-query captures a row from Table 5 and predicates p2-p4 are expanded to T1.c2<T2.c3, T2.c3=T2.c4 and T1.c1<>T2.c4, respectively. The sub-query at Line 2 of listing (408) captures Row 1 of revised structure (406), where selection T1.* represents access and the where condition captures the predicates (tt) and correlation. Similarly, the sub-query at Line 4 in listing (408) captures Row 2 in revised structure (406). Accessed columns are given by the selected items, whereas predicates p2$\lor$p3 and correlation are given by columns in the "where" clause.

FIG. 5 continues the example of FIG. 4, for evaluating target queries.

Namely, FIG. 5 is directed to evaluating three example target queries in listing (502) using the generalized query of FIG. 4. In the example shown in FIG. 5, the three predicates in the above queries are denoted by q1, q2 and q3 respectively. In the first case, access to T1.c5 is unrestricted by the generalized query of FIG. 4 but the access to T2.c3 still requires p2$\lor$p3 to hold. Thus, the target query in line 1 is split into the following two cases: Case 1 is (T1.c5, q1, {T1.c5, T2.c3}), which is covered by the first sub-query in the generalized query. The Boolean predicate is true, so no further check is required. Case 2 is (T2.c3, q1, {T1.c5, T2.c3}), which is covered by the second sub-query of the generalized query. Hence, the requirement q1=>(p2 $\lor$p3).

The second query and third query of listing (502) are rejected as access to T2.c6 is not permitted by the generalized query. This is an example of a malicious query which is accessing more information than in the input examples. Note, that in the second case the access to T1.c5 is permitted and does not depend on the predicate. The comparison result is summarized in table (504).

The example of FIG. 4 and FIG. 5 is focused on column generalization of accessed columns. Predicate abstraction is another form of generalization. Predicate abstraction can be computed by external tools. For example, consider the interval domain for individual variables. If the predicate in question is $(x<y\land y>12)\lor(y<5)$, the resulting abstraction can be $(y<5 \lor y>12)$. The relationship between x and y is not maintained as if y<5 the value of x is unconstrained. Here, an input with the constraint y=6 will be rejected while an input with the constraint x=5, y=4 will be accepted.

Using a more complex domain, the relationship between variables can be maintained. The previous example of $(x<y \wedge y>12) \vee (y<5)$ is directly representable. A more complex example of $x+y+z<10$ can be split into $(x+y<10 \wedge z \leq 0) \vee (y+z<10 \wedge x \leq 0) \vee (x+z<10 \wedge y \leq 0)$. The exact abstraction will depend on the tool being used.

From a security perspective, all positive examples should be allowed while all negative examples should be disallowed. One or more embodiments separately generalize the positive examples and negative examples, respectively. Having two generalized queries, say Q+ for the generalized positive query, and Q− for the generalized negative query, a set difference of the information flows can be used to determine what is allowed. In one or more embodiments, only queries that are in the positive generalized query and not in the negative generalized query are allowed.

Embodiments disclosed herein may be implemented on a computing system specifically designed to achieve an improved technological result. When implemented in a computing system, the features and elements of this disclosure provide a significant technological advancement over computing systems that do not implement the features and elements of the disclosure. Any combination of mobile, desktop, server, router, switch, embedded device, or other types of hardware may be improved by including the features and elements described in the disclosure. For example, as shown in FIG. 6A, the computing system (600) may include one or more computer processors (602), non-persistent storage (604) (e.g., volatile memory, such as random access memory (RAM), cache memory), persistent storage (606) (e.g., a hard disk, an optical drive such as a compact disk (CD) drive or digital versatile disk (DVD) drive, a flash memory, etc.), a communication interface (612) (e.g., Bluetooth interface, infrared interface, network interface, optical interface, etc.), and numerous other elements and functionalities that implement the features and elements of the disclosure.

The computer processor(s) (602) may be an integrated circuit for processing instructions. For example, the computer processor(s) may be one or more cores or micro-cores of a processor. The computing system (600) may also include one or more input devices (610), such as a touchscreen, keyboard, mouse, microphone, touchpad, electronic pen, or any other type of input device.

The communication interface (612) may include an integrated circuit for connecting the computing system (600) to a network (not shown) (e.g., a local area network (LAN), a wide area network (WAN) such as the Internet, mobile network, or any other type of network) and/or to another device, such as another computing device.

Further, the computing system (600) may include one or more output devices (608), such as a screen (e.g., a liquid crystal display (LCD), a plasma display, touchscreen, cathode ray tube (CRT) monitor, projector, or other display device), a printer, external storage, or any other output device. One or more of the output devices may be the same or different from the input device(s). The input and output device(s) may be locally or remotely connected to the computer processor(s) (602), non-persistent storage (604), and persistent storage (606). Many different types of computing systems exist, and the aforementioned input and output device(s) may take other forms.

Software instructions in the form of computer readable program code to perform embodiments disclosed herein may be stored, in whole or in part, temporarily or permanently, on a non-transitory computer readable medium such as a CD, DVD, storage device, a diskette, a tape, flash memory, physical memory, or any other computer readable storage medium. Specifically, the software instructions may correspond to computer readable program code that, when executed by a processor(s), is configured to perform one or more embodiments disclosed herein.

Figure 6A:
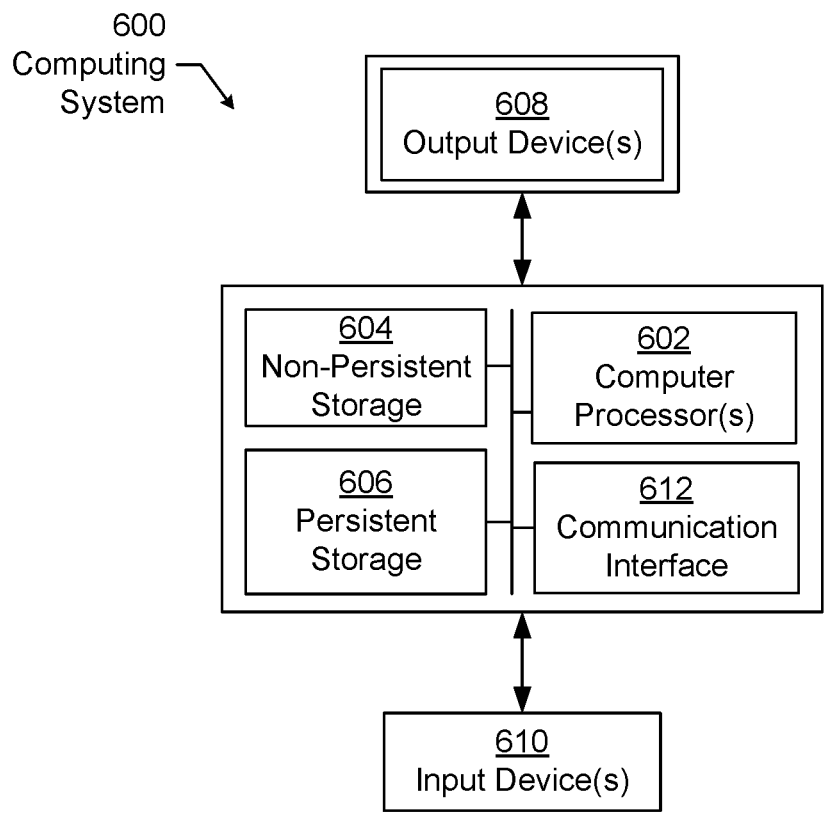
FIG. 6A and FIG. 6B show computing systems in accordance with one or more embodiments of the invention.
Figure 6B:
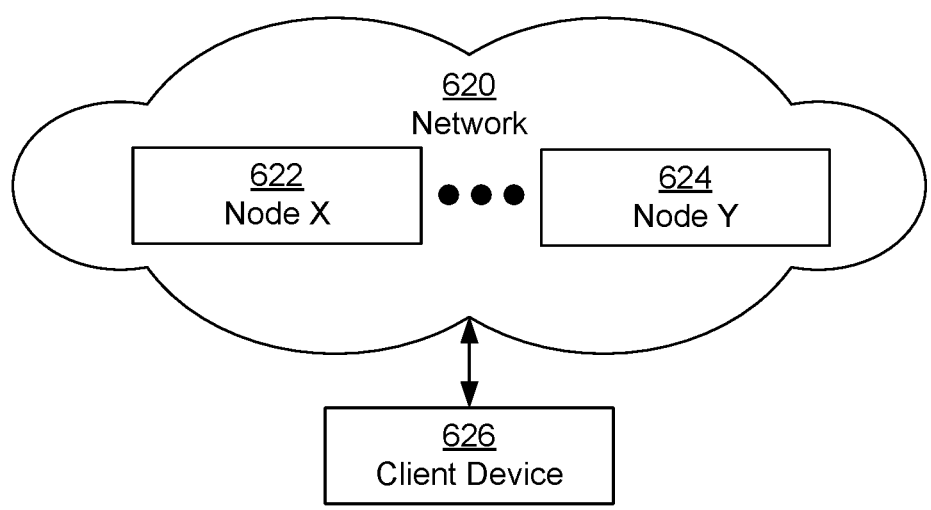

The computing system (600) in FIG. 6A may be connected to or be a part of a network. For example, as shown in FIG. 6B, the network (620) may include multiple nodes (e.g., node X (622), node Y (624)). Each node may correspond to a computing system, such as the computing system shown in FIG. 6A, or a group of nodes combined may correspond to the computing system shown in FIG. 6A. By way of an example, embodiments disclosed herein may be implemented on a node of a distributed system that is connected to other nodes. By way of another example, embodiments disclosed herein may be implemented on a distributed computing system having multiple nodes, where each portion disclosed herein may be located on a different node within the distributed computing system. Further, one or more elements of the aforementioned computing system (600) may be located at a remote location and connected to the other elements over a network.

Although not shown in FIG. 6B, the node may correspond to a blade in a server chassis that is connected to other nodes via a backplane. By way of another example, the node may correspond to a server in a data center. By way of another example, the node may correspond to a computer processor or micro-core of a computer processor with shared memory and/or resources.

The nodes (e.g., node X (622), node Y (624)) in the network (620) may be configured to provide services for a client device (626). For example, the nodes may be part of a cloud computing system. The nodes may include functionality to receive requests from the client device (626) and transmit responses to the client device (626). The client device (626) may be a computing system, such as the computing system shown in FIG. 6A. Further, the client device (626) may include and/or perform all or a portion of one or more embodiments disclosed herein.

The computing system or group of computing systems described in FIGS. 6A and 6B may include functionality to perform a variety of operations disclosed herein. For example, the computing system(s) may perform communication between processes on the same or different system. A variety of mechanisms, employing some form of active or passive communication, may facilitate the exchange of data between processes on the same device. Examples representative of these inter-process communications include, but are not limited to, the implementation of a file, a signal, a socket, a message queue, a pipeline, a semaphore, shared memory, message passing, and a memory-mapped file. Further details pertaining to a couple of these non-limiting examples are provided below.

Based on the client-server networking model, sockets may serve as interfaces or communication channel endpoints enabling bidirectional data transfer between processes on the same device. Foremost, following the client-server networking model, a server process (e.g., a process that provides data) may create a first socket object. Next, the server process binds the first socket object, thereby associating the first socket object with a unique name and/or address. After creating and binding the first socket object, the server process then waits and listens for incoming connection requests from one or more client processes (e.g., processes that seek data). At this point, when a client process wishes to obtain data from a server process, the client process starts by creating a second socket object. The client process then proceeds to generate a connection request that includes at least the second socket object and the unique name and/or address associated with the first socket object. The client process then transmits the connection request to the server process. Depending on availability, the server process may accept the connection request, establishing a communication channel with the client process, or the server process, busy in handling other operations, may queue the connection request in a buffer until server process is ready. An established connection informs the client process that communications may commence. In response, the client process may generate a data request specifying the data that the client process wishes to obtain. The data request is subsequently transmitted to the server process. Upon receiving the data request, the server process analyzes the request and gathers the requested data. Finally, the server process then generates a reply including at least the requested data and transmits the reply to the client process. The data may be transferred, more commonly, as datagrams or a stream of characters (e.g., bytes).

The computing system in FIG. 6A may implement and/or be connected to a data repository. For example, one type of data repository is a database. A database is a collection of information configured for ease of data retrieval, modification, re-organization, and deletion. Database Management System (DBMS) is a software application that provides an interface for users to define, create, query, update, or administer databases.

The user, or software application, may submit a statement or query into the DBMS. Then the DBMS interprets the statement. The statement may be a select statement to request information, update statement, create statement, delete statement, etc. Moreover, the statement may include parameters that specify data, or data container (database, table, record, column, view, etc.), identifier(s), conditions (comparison operators), functions (e.g. join, full join, count, average, etc.), sort (e.g. ascending, descending), or others. The DBMS may execute the statement. For example, the DBMS may access a memory buffer, a reference or index a file for read, write, deletion, or any combination thereof, for responding to the statement. The DBMS may load the data from persistent or non-persistent storage and perform computations to respond to the query. The DBMS may return the result(s) to the user or software application.

The above description of functions presents only a few examples of functions performed by the computing system of FIG. 6A and the nodes and/or client device in FIG. 6B. Other functions may be performed using one or more embodiments disclosed herein.

In the application, ordinal numbers (e.g., first, second, third, etc.) may be used as an adjective for an element (i.e., any noun in the application). The use of ordinal numbers is not to imply or create any particular ordering of the elements nor to limit any element to being only a single element unless expressly disclosed, such as by the use of the terms "before", "after", "single", and other such terminology. Rather, the use of ordinal numbers is to distinguish between the elements. By way of an example, a first element is distinct from a second element, and the first element may encompass more than one element and succeed (or precede) the second element in an ordering of elements.

While the invention has been described with respect to a limited number of embodiments, those skilled in the art, having benefit of this disclosure, will appreciate that other embodiments can be devised which do not depart from the scope of the invention as disclosed herein. Accordingly, the scope of the invention should be limited only by the attached claims.

What is claimed is:

1. A method for detecting a security vulnerability of a target query to a database, the method comprising:
   obtaining a set of training queries, each training query comprising a predicate and one or more accessed columns returned from evaluating the predicate;
   transforming the set of training queries into a structure, the structure relating, for an accessed column and a training query, the predicate and a correlation value to the accessed column;
   normalizing the structure into a normalized structure, the normalized structure grouping entries in the structure according to accessed column;
   generating a generalized query from the normalized structure;
   adding the generalized query to a query filter list; and
   preventing execution of the target query based on a comparison with the query filter list.

2. The method of claim 1, wherein generating the generalized query comprises:
   generalizing at least one entry in the normalized structure to create a generalized structure, and
   generating the generalized query from the generalized structure.

3. The method of claim 1, wherein generating the generalized query comprises:
   determining that a threshold portion of columns of a table are accessed columns in the normalized structure, and
   changing a plurality of accessed column identifiers in the table to a generic table identifier.

4. The method of claim 1, wherein generating the generalized query comprises:
   performing predicate generalization of at least one predicate in the normalized structure.

5. The method of claim 1, further comprising:
   receiving the target query;
   comparing the target query to the generalized query in the query filter list to obtain a comparison result; and
   making a determination whether to execute the target query based on the comparison result.

6. The method of claim 5, wherein comparing the target query to the generalized query comprises at least one selected from a group consisting of:
   determining that a target accessed column in the target query is not a subset of the accessed column in the generalized query,
   determining that the target accessed column is not a subset of a plurality of accessed columns, and
   determining that a target predicate fails to imply a generalized predicate.

7. The method of claim 1, further comprising:
   determining a group of accessed columns that are accessed in the training query; and
   adding the group of accessed columns as the correlation value for the accessed column.

8. The method of claim 1, wherein normalizing the structure into the normalized structure comprises:
   grouping a subset of entries in the structure that are for a same accessed column by generating a disjunction of predicates in the subset of entries, and
   relating the disjunction to the accessed column in the normalized structure.

9. The method of claim 1, wherein generating the generalized query comprises:
  generating entries in the normalized structure to create a plurality of generalized entries,
  generating a union of sub-queries, each sub-query corresponding to a generalized entry of the normalized structure, and
  generating the generalized query from the union.

10. A system for detecting a security vulnerability of a target query to a database, the system comprising:
  a memory comprising a query analyzer repository configured to store:
    a query filter list comprising a generalized query, and
    a set of training queries, each training query comprising a predicate and one or more accessed columns returned from evaluating the predicate;
  at least one computer processor; and
  a query filter list generator executing on the at least one computer processor configured to:
    transform the set of training queries into a structure, the structure relating individually, for an accessed column and a training query, the predicate and a correlation value to the accessed column,
    normalize the structure into a normalized structure, the normalized structure grouping entries in the structure according to accessed column,
    generate the generalized query from the normalized structure, and
    add the generalized query to the query filter list,
  the at least one computer processor preventing execution of the target query based on a comparison with the query filter list.

11. The system of claim 10, further comprising:
  a generalized structure comprising at least one entry in the normalized structure to create the generalized structure,
  wherein the generalized query is generated from the generalized structure.

12. The system of claim 10, wherein the query analyzer repository comprises:
  a threshold number, representing a portion of columns of a table that are accessed columns in the normalized structure to change a plurality of accessed column identifiers in the table to a generic table identifier.

13. The system of claim 12, wherein the threshold number is a percentage.

14. The system of claim 10, further comprising:
  a query filter executing on the at least one computer processor configured to:
    receive the target query,
    compare the target query to the generalized query in the query filter list to obtain a comparison result, and
    make a determination whether to execute the target query based on the comparison result.

15. The system of claim 14, wherein comparing the target query to the generalized query comprises at least one selected from a group consisting of:
  determining that a target accessed column in the target query is not a subset of a permitted accessed column in the generalized query,
  determining that the target accessed column is not a subset of a plurality of permitted accessed columns, and
  determining that a target predicate fails to imply a permitted predicate.

16. A method for preventing a security vulnerability of a target query to a database, the method comprising:
  receiving the target query;
  comparing the target query to a generalized query in a query filter list to obtain a comparison result, wherein the query filter list is generated by generalizing a set of training queries into the generalized query, wherein generating the query filter list comprises:
    transforming the set of training queries into a structure, the structure relating, for an accessed column and a training query, a predicate and a correlation value to the accessed column,
    normalizing the structure into a normalized structure, the normalized structure grouping entries in the structure according to accessed column,
    generating the generalized query from the normalized structure, and
    adding the generalized query to the query filter list;
  making a determination whether to execute the target query based on the comparison result; and
  preventing execution of the target query based on a comparison with the query filter list.

17. The method of claim 16, wherein comparing the target query to the generalized query comprises at least one selected from a group consisting of:
  determining that a target accessed column in the target query is not a subset of a permitted accessed column in the generalized query,
  determining that the target accessed column is not a subset of a plurality of permitted accessed columns, and
  determining that a target predicate fails to imply a permitted predicate.

18. The method of claim 16, wherein generating the query filter list further comprises:
  obtaining the set of training queries, each training query comprising the predicate and one or more accessed columns returned from evaluating the predicate.

19. The method of claim 18, wherein generating the generalized query comprises:
  generalizing at least one entry in the normalized structured to create a generalized structure, and
  generating the generalized query from the generalized structure.

20. The method of claim 18, wherein generating the generalized query comprises:
  determining that a threshold portion of columns of a table are accessed columns in the normalized structure, and
  changing a plurality of accessed column identifiers in the table to a generic table identifier.

* * * * *